United States Patent Office 3,795,670
Patented Mar. 5, 1974

3,795,670
PROCESS FOR MAKING STARCH TRIACETATES
Arthur M. Mark and Charles L. Mehltretter, Peoria, Ill., assignors to the United States of America as represented by the Secretary of Agriculture
No Drawing. Filed Mar. 5, 1973, Ser. No. 337,790
Int. Cl. C08b 19/04
U.S. Cl. 260—233.5
5 Claims

ABSTRACT OF THE DISCLOSURE

An improved process for the esterification of starches such as high-amylose starches and amylose under conditions of minimum depolymerization of the polysaccharide to obtain high molecular weight starch triacetates soluble in organic solvents for fiber and film manufacture is described.

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to the acetylation of starch with acetic anhydride and an alkaline catalyst. The preparation of undegraded starch triacetates generally utilizes pretreatments that swell or disintegrate the starch granules after which acetylation is carried out in acetic anhydride-pyridine. This procedure is impractical for commercial application not only because of the added expense of pretreatment, but also because of the high cost of pyridine and the difficulty and cost of its recovery in the presence of acetic acid. When acetic anhydride alone is used as the acetylating agent, such catalysts as sulfuric acid, p-toluene sulfonic acid, and zinc chloride are employed. This reaction yields molecularly degraded starch triacetates. It is known that amylose triacetate prepared in this manner is not satisfactory for the preparation of fibers and films of high tensile strength.

In the prior art Kerr et al. [Cereal Chem. 19:79 (1942)] acetylated corn starch of 2–3 percent moisture content by suspending the starch in acetic anhydride in the presence of fused sodium acetate under anhydrous conditions and refluxing the mixture for 4 days. The product, however, contained only 43.5 percent acetyl content in contrast to 44.8 percent for the triacetate. The disadvantages of this procedure are that (1) starch at 2–3 percent moisture content is not obtainable commercially and is costly to prepare; (2) anhydrous conditions are difficult to maintain in a large-scale operation; and (3) the long time of acetylation is impractical for industrial product. In 1952, Jeans and Jones [J. Amer. Chem. Soc. 74:6117–6118 (1952)] obtained starch triacetates by heating pretreated air-dried amylose starch in acetic anhydride at 100° C. for 6 hours in the presence of fused sodium acetate which was 30 percent by weight of the amylose. However, their pretreatment of the amylose by gelatinization in water at 100° C. followed by precipitation in a large volume of ethanol prior to acetylation is a costly procedure. Furthermore, it was necessary for them to use a ratio of 80 parts of acetic anhydride to 5 parts of amylose (16:1) with the large amount of catalyst.

In accordance with the invention, we have discovered an improved process for the production of essentially undegraded starch triacetates comprising: reacting acetic anhydride and starch in a weight ratio of 4:1 acetic anhydride to starch in the present of an amount of sodium hydroxide equal to about 11 percent of the dry weight of starch.

DETAILED DESCRIPTION OF THE INVENTION

The instant invention does not require expensive pretreatment of the starch, or the use of pyridine, or an anhydrous system. Moisture content of the starch is not critical in our invention so that commercial starches which contain 8 to 12 percent moisture can be used directly. Furthermore, a ratio of 80 parts of acetic anhydride to 20 parts of starch (4:1) can be successfully used which is a fourfold reduction of acetic anhydride below that used by Jeans and Jones, supra. Also, the preferred catalyst, sodium hydroxide, is used in 50 percent aqueous solution at only 11 percent of the dry weight of the starch instead of the large amount of the more costly fused sodium acetate used in the prior art process. However, the amount of catalyst used in the instant reaction is quite critical. Too little does not achieve complete acetylation of the starch in 5 hours, and too much causes considerable degradation along with incomplete acetylation as will be shown hereafter.

The extent of degradation occurring during acetylation was determined by comparing the viscosities of the starches before and after acetylation. High-amylose corn starch before acetylation had an intrinsic viscosity of 1.09 or a calculated molecular weight of 379,545. After acetylation by the process of this invention, the intrinsic viscosity of the regenerated starch was 1.04 which is a molecular weight of 360,039 and indicates that only about 5 percent of depolymerization had occurred. On the other hand, acetylation of the same high-amylose corn starch by the method of Kerr et al., supra, produced a starch regenerated from its triacetate having an intrinsic viscosity of only 0.9. This calculates to be a molecular weight of 306,054 which is about 19 percent of molecular degradation.

Although it is preferred to utilize essentially undegraded amylose obtained by the fractionation of corn starch or potato starch in our process, high-amylose starches (i.e., those starches which contain at least 70% by weight amylose), usually obtained from high-amylose corn, may also be used as well as the ordinary corn, potato, wheat, and other starches of commerce. The preferred catalyst is sodium hydroxide added as a 50 percent aqueous solution, but other alkalies, as well as sodium acetate, may also be used. The presence of a limited amount of water due to the moisture content of the starches and the 50 percent aqueous solution of sodium hydroxide catalyst is not deleterious to obtaining starch triacetates of high quality and good organic solvent solubility. Films prepared by casting dichloromethane solutions of amylose triacetates prepared by the improved process of the invention show high clarity and tensile strength. The preferred temperature of reaction is about 123° C. with a time of acetylation of about 5 hours to achieve maximum esterification. Lower temperatures can be used at the sacrifice of speed of acetylation. At the conclusion of the reaction, the acetic acid formed and any excess acetic anhydride is recovered by vacuum distillation for conversion of the acetic acid to acetic anhydride for recycling. The starch triacetate product is recovered by precipitation with alcohol or preferably by precipitation with water in which it is completely insoluble.

The following examples will further illustrate this invention. The parts specified are parts by weight.

Example 1

Twenty-three parts of pearl corn starch (20 parts, dry basis) were placed in a reactor equipped with a stirrer, thermometer, sampler tube, and reflux condenser, and immersed in a silicone bath. The temperature of the bath was raised to 150°–160° C. and 80 parts of acetic anhydride were added to the starch followed by 4.4 parts of 50 percent sodium hydroxide solution with stirring to produce a homogeneous slurry. The reaction temperature reached 129° C. at first but stabilized at 123° C. as the reaction proceeded and acetic acid was formed. Small samples were removed from the reaction mixture each hour over 5 hours of reaction time and product recovered by precipitation with ethanol for acetyl analysis. During this time the reaction mixture proceeded through slurry and white emulsion stages to a light amber sirup. After 5 hours the remainder of the solution was precipitated with a large volume of water with vigorous agitation, filtered, washed free of acid, air dried. The yield was quantitative for triacetate. Approximately 0.5-g. samples of the product were dried in vacuo at 100° C. for 3 hours, weighed accurately in 125-ml. glass-stoppered Erlenmeyer flasks and assayed according to the Genung and Mallot [Ind. Eng. Chem., Anal. Ed. 13:369 (1941)] procedure for acetyl groups, Table 1.

TABLE 1

| | Acetyl, percent [1] | | | | |
|---|---|---|---|---|---|
| | Ex. 1 | Ex. 2 | Corn amylose Ex. 3 | Potato amylose [2] Ex. 4 | High-amylose corn starch [3] Ex. 5 |
| Reaction time, hours: | | | | | |
| 1 | 33.5 | 34.2 | 37.0 | 33.8 | 31.0 |
| 2 | | | | | 36.8 |
| 3 | 41.5 | 39.0 | 39.5 | 41.7 | 38.1 |
| 4 | | | | | 41.1 |
| 5 | 44.8 | 44.3 | 44.8 | 44.8 | 44.5 |

[1] Yield of triacetates for all of the examples was over 95% of theory.
[2] Free of residual magnesium sulfate.
[3] 70% amylose content by weight.

Example 2

22.6 parts (20 parts, dry basis) of commercial potato starch was acetylated according to the procedure of Example 1. After 5 hours of reaction, the acetic acid and unreacted acetic anhydride in the reactor were removed by vacuum distillation at a pressure of 3 inches of mercury and the starch triacetate residue remaining was slurried in water, filtered, washed free of residual acid, air dried, and analyzed for percent acetyl, Table 1. The yield was 35 parts of amylose triacetate which is 98 percent of the theoretical.

Example 3

Twenty-two parts (20 parts, dry basis) of amylose obtained by fractionation of corn starch was acetylated according to the procedure of Example 1. After 5 hours of reaction, the acetic acid and unreacted acetic anhydride in the reactor were removed by vacuum distillation at a pressure of 3 inches of mercury and the starch triacetate residue remaining was slurried in water, filtered, washed free of residual acid, air dried, and analyzed for percent acetyl, Table 1. The yield was 35 parts of amylose triacetate which is 98 percent of the theoretical.

The extent of degradation occurring during acetylation was determined by using the viscometric relation of Cowie [Makromol. Chem. 42:230 (1961)], intrinsic viscosity $= 1.18 \times 10^{-5} (\overline{M}_w)^{0.89}$, to calculate the molecular weight of starches before and after acetylation. The intrinsic viscosity $$\left[ \text{expressed as } \lim_{c \to 0} \left( \frac{\ln \eta_r}{c} \right) \right]$$

[Cragg, L. H., J. Colloid Sci. 1:261 (1946)] at 25° C. of each starch regenerated from its triacetate by mild saponification [Mark et al., Stärke 22:108 (1970)] was compared to that of the parent starch, Table 2.

TABLE 2

| | Intrinsic viscosity 1 N KOH, 25° C. | | |
|---|---|---|---|
| Starch | Before acetylation | After acetylation | Degradation, percent [1] |
| Example 3 | 1.07 | 1.01 | 6 |
| Example 4 [2] | 1.44 | 1.39 | 4 |
| Example 5: | | | |
| 11% catalyst | 1.09 | 1.04 | 5 |
| 22% catalyst | 1.09 | 0.94 | 15 |

[1] Calculations based on Cowie equation, supra.
[2] Free of residual magnesium sulfate.

Example 4

Commercial potato amylose obtained by fractionation of potato starch was washed with water to remove magnesium sulfate impurity and dried. Twenty-two parts (20 parts, dry basis) of the amylose was then acetylated according to the procedure of Example 1. After 5 hours of reaction, the acetic acid and unreacted acetic anhydride in the reactor were removed by vacuum distillation at a pressure of 3 inches of mercury and the starch triacetate residue remaining was slurried in water, filtered, washed free of residual acid, air dried, and analyzed for percent acetyl, Table 1. The yield was 34 parts of amylose triacetate which is 96 percent of the theoretical.

When potato amylose containing the magnesium sulfate impurity was acetylated by the above procedure, only 36 perecnt acetyl was found in the product and some degradation had occurred.

Intrinsic viscosity was determined as described in Example 3, Table 2.

Example 5

Twenty-three grams (20 g., dry basis) of high-amylose corn starch having a 70 perecnt by weight amylose content was acetylated according to the procedure of Example 1, Table 1. The results were compared to those from the acetylations of high-amylose corn starch conducted using no catalyst, 5.5 percent sodium hydroxide, and 22 percent sodium hydroxide based on the dry weight of the starch. The alkali was added in 50 percent aqueous solution. Table 3 shows the results of the acetylation over the 5-hour period of reaction.

TABLE 3

| | Percent reation | | | |
|---|---|---|---|---|
| NaOH, percent | 22 | 11 [1] | 5.5 | 0 |
| Reaction time, hours: | | | | |
| 1 | 34.9 | 31.0 | 19.0 | |
| 3 | 37.7 | 38.1 | 32.0 | 12.0 |
| 5 | 37.7 | 44.5 | 38.0 | 13.5 |

[1] Data obtained from Table 1, Example 5.

The reaction using 11 percent of catalyst, conducted according to the invention, produced essentially complete acetylation of the high-amylose corn starch. However, both the higher (22 percent) and lower (5.5 percent) amounts of sodium hydroxide did not yield complete acetylation in 5 hours of reaction. Furthermore, the intrinsic viscosity (determined as described in Example 3) of the starch regenerated from the starch acetate obtained with the 22 perecnt of catalyst was 0.94 and indicated that considerable depolymerization of the product had occurred during the acetylation, Table 2.

We claim:

1. An improved process for the production of essentially undegraded starch triacetate comprising: reacting acetic anhydride and starch in a weight ratio of about 4:1 acetic anhydride to starch in the presence of an amount of sodium hydroxide equal to about 11 percent of the dry weight of the starch at a temperature of about 123° C.

2. A process as described in claim 1 in which the starch is corn starch.

3. A process as described in claim 1 in which the starch is potato starch.

4. A process as described in claim 1 in which the starch is amylose.

5. A process as described in claim 1 in which the starch is high-amylose starch.

References Cited

UNITED STATES PATENTS 3,549,619  12/1970  Mark et al. _____ 260—233.5
3,553,196  1/1971   Mark et al. _____ 260—233.5

DONALD E. CZAJA, Primary Examiner

M. I. MARQUIS, Assistant Examiner

U.S. Cl. X.R.

260—233.3 R